O. B. PECK.
CENTRIFUGAL ORE SEPARATOR.
No. 11,367. Reissued Sept. 26, 1893.
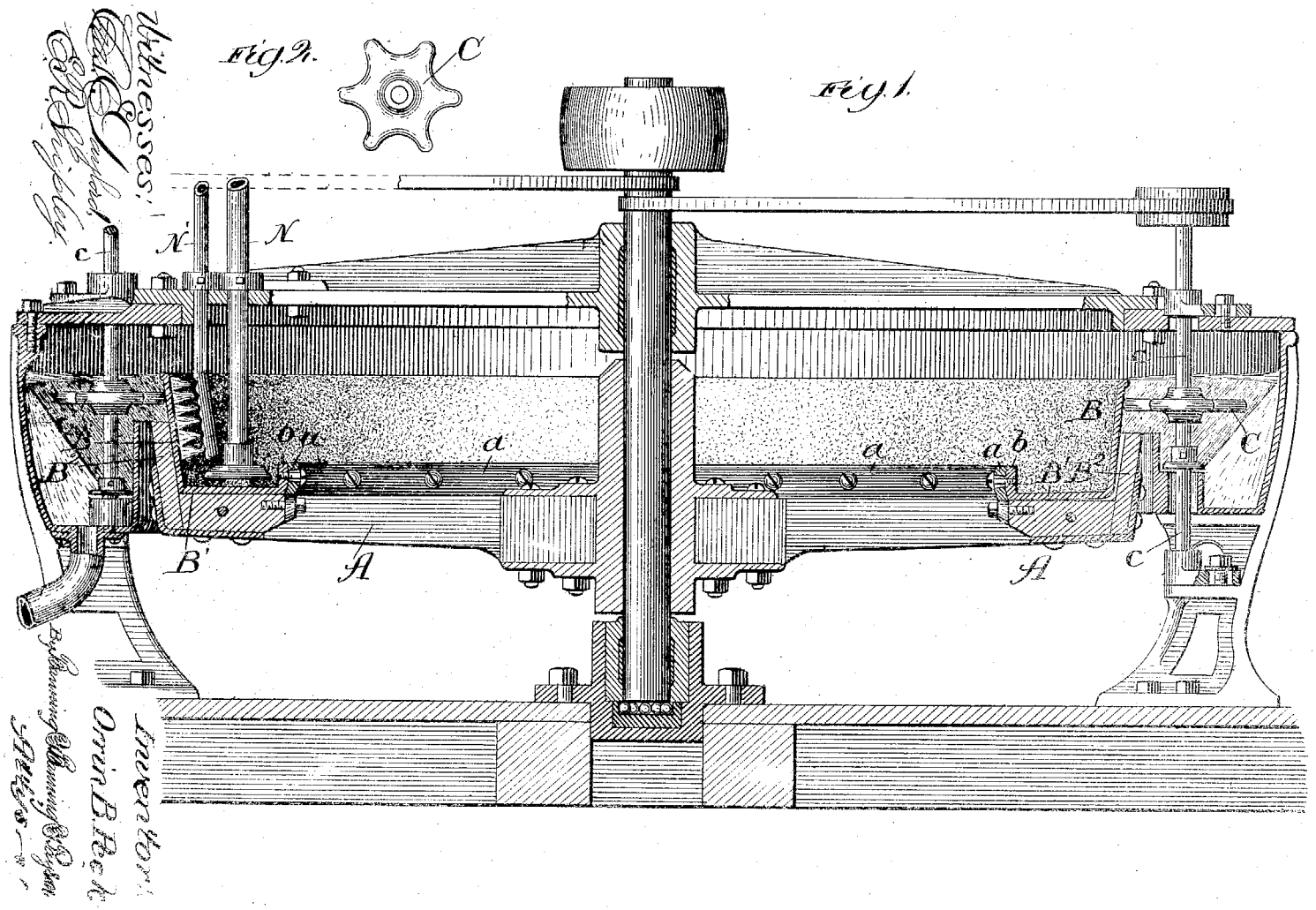

O. B. PECK.

CENTRIFUGAL ORE SEPARATOR.

No. 11,367. Reissued Sept. 26, 1893.

Witnesses:
Chas. E. Gaylord.
E. R. Shipley.

Inventor:
Orrin B. Peck.
By Banning & Banning & Payson,
Att'ys.

O. B. PECK.

CENTRIFUGAL ORE SEPARATOR.

No. 11,367. Reissued Sept. 26, 1893.

Witnesses:
Chas. E. Gaylord,
E. R. Shipley.

Inventor:
Orrin B. Peck.
By Banning & Banning & Taylor,
Att'ys.

O. B. PECK.
CENTRIFUGAL ORE SEPARATOR.
No. 11,367. Reissued Sept. 26, 1893.
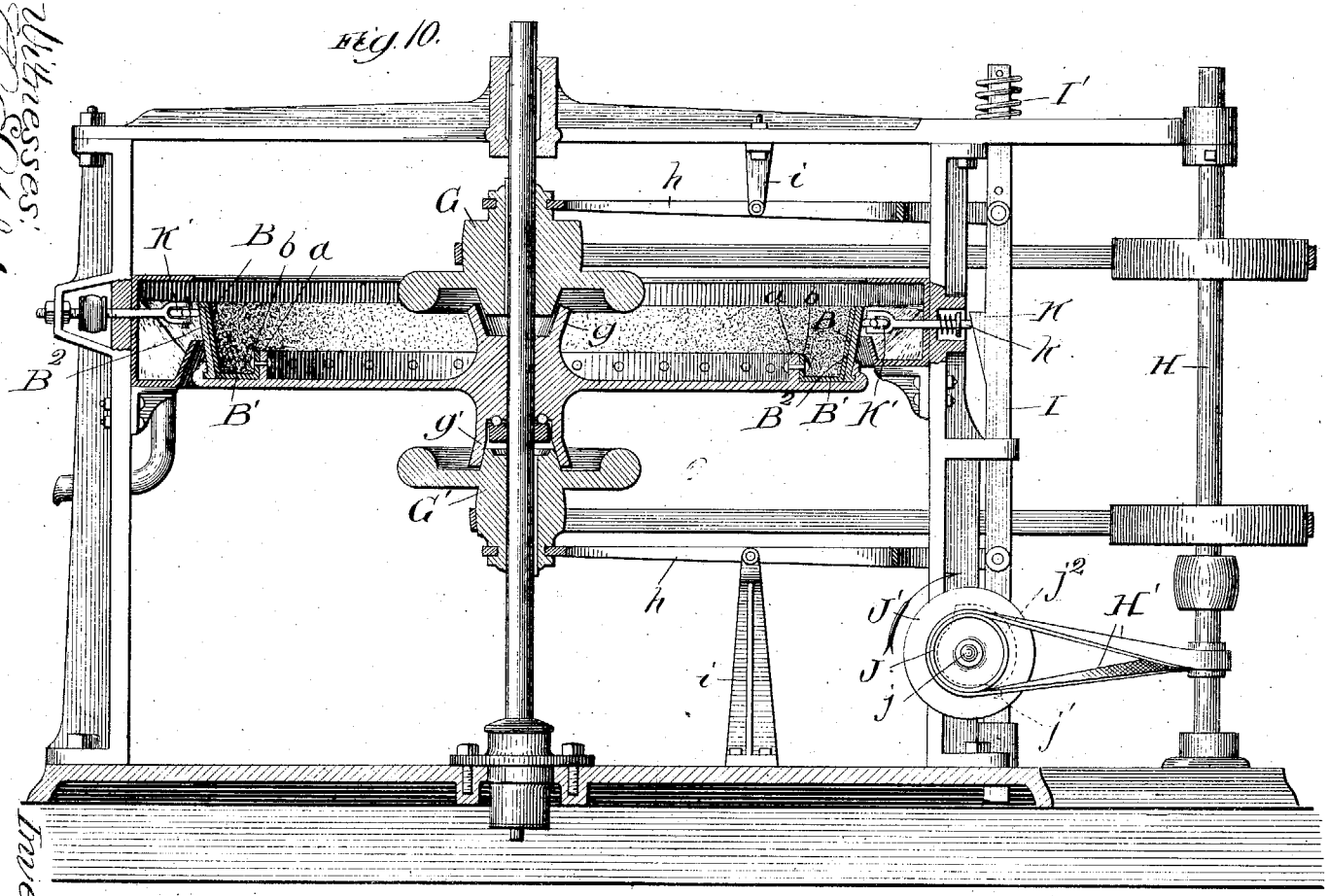
Witnesses:
Chas. E. Saylord.
E. R. Shipley.
Inventor.
Orrin B. Peck,
By Renning & Renning & Payson,
Att'ys.

O. B. PECK.

CENTRIFUGAL ORE SEPARATOR.

No. 11,367. Reissued Sept. 26, 1893.

Witnesses:
Chas. E. Gaylord,
E. R. Shipley

Inventor:
Orrin B. Peck.
By Banning & Banning & Payson,
Att'ys.

UNITED STATES PATENT OFFICE.

ORRIN B. PECK, OF CHICAGO, ILLINOIS, ASSIGNOR, BY MESNE ASSIGNMENTS, TO THE PATENT TITLE COMPANY, OF SAME PLACE.

CENTRIFUGAL ORE-SEPARATOR.

SPECIFICATION forming part of Reissued Letters Patent No. 11,367, dated September 26, 1893.

Original No. 499,342, dated June 13, 1893. Application for reissue filed August 7, 1893. Serial No. 482,619.

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

The object of my invention relates more particularly to the separating surface used in centrifugal ore separators, and more specifically to making the separating surface vibratory, and means for imparting a yielding or vibratory motion to such separating rim or surface; and my invention consists in the features and details of construction hereinafter described and claimed.

Figure 3:
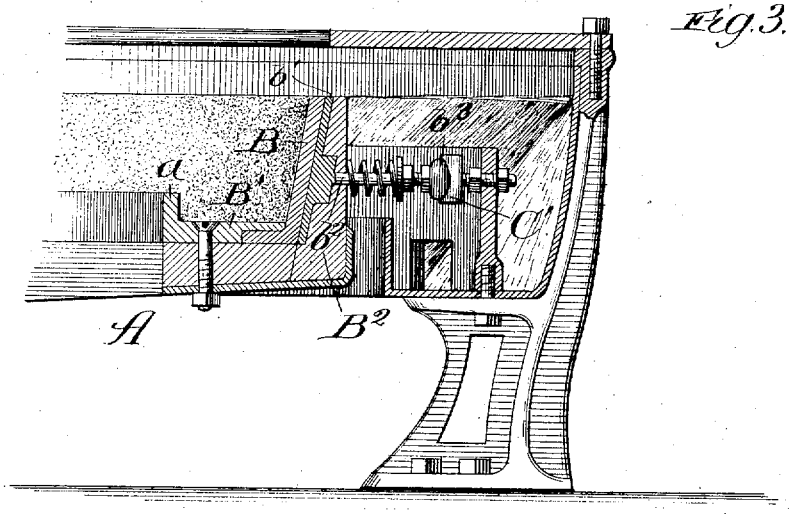
Figure 4:
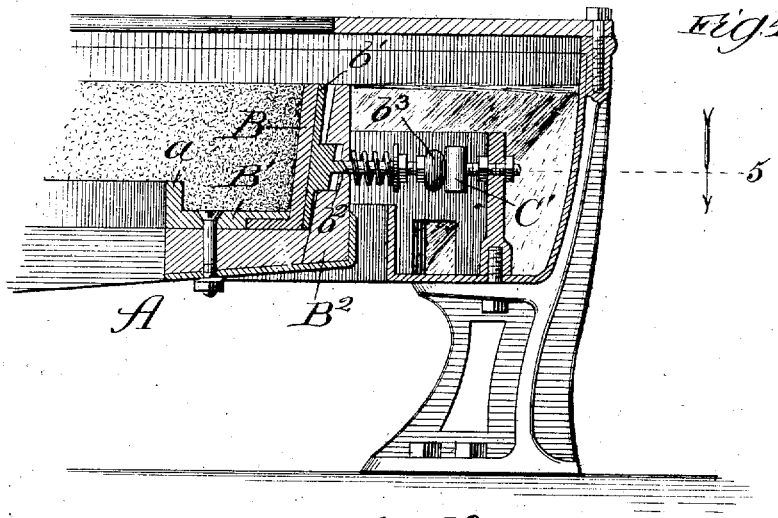
Figure 5:
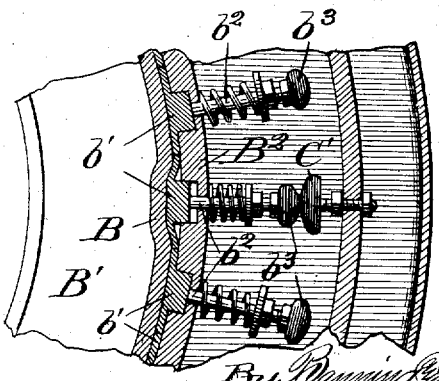
Figure 6:
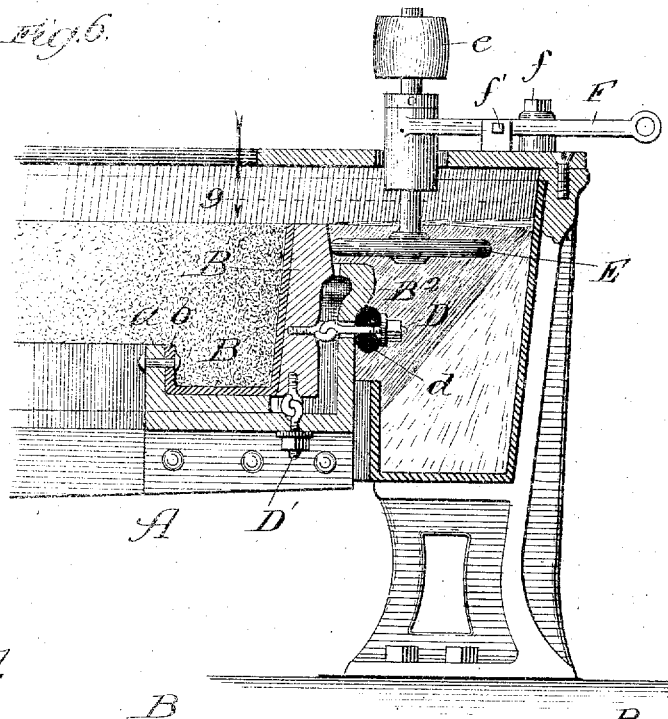
Figure 7:
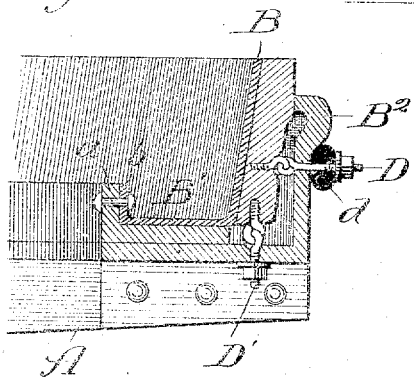
Figure 8:
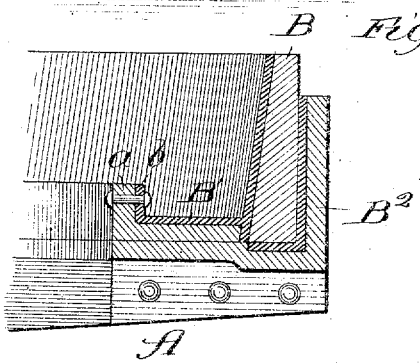
Figure 9:
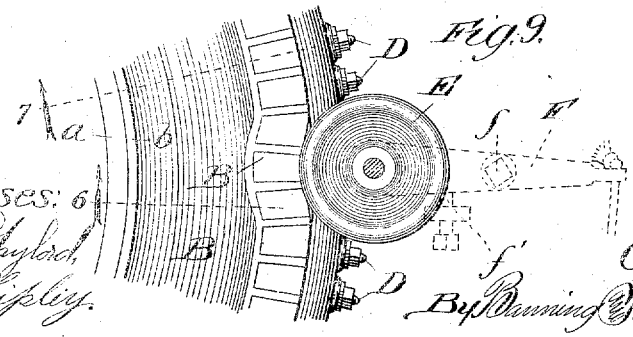
Figure 1:
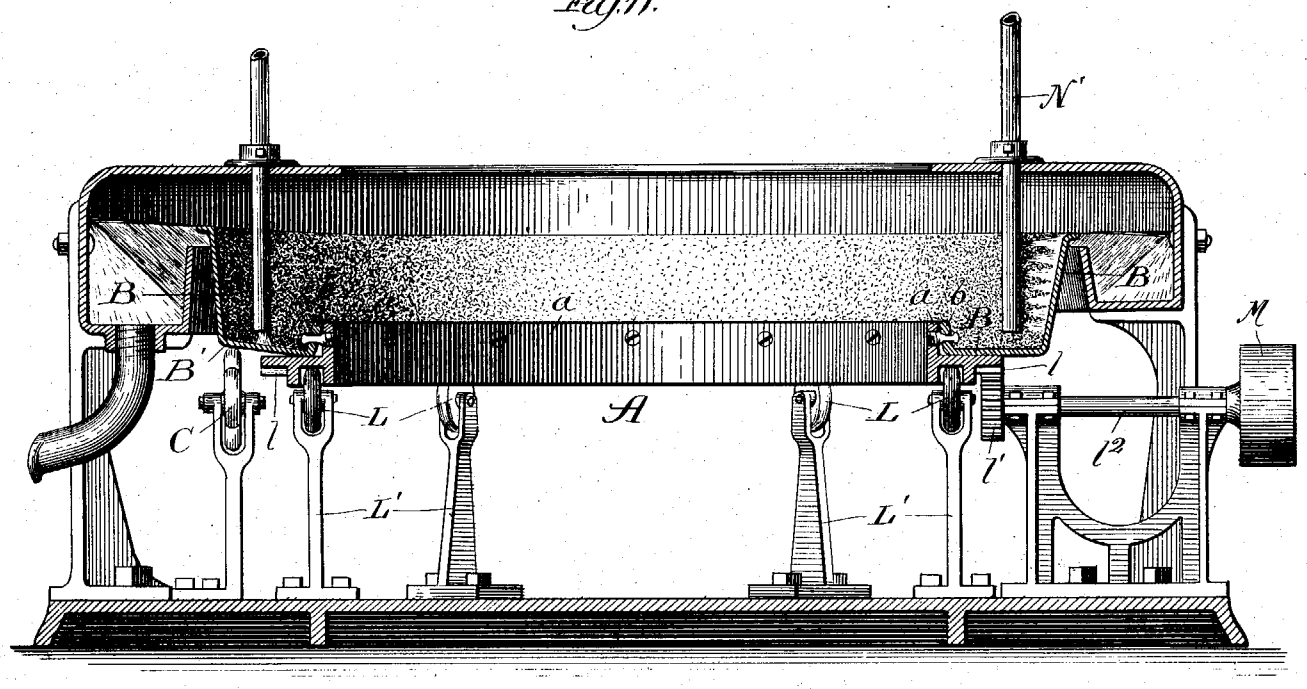

In the drawings, Figure 1 is a transverse vertical central section of a wheel containing my improvements. Fig. 2 is a plan view of a cam wheel hereinafter described. Figs. 3 and 4 are vertical sections of portions of the rim of a separating wheel in somewhat different positions. Fig. 5 is a plan sectional view on line 5 of Fig. 4, looking in the direction of the arrows. Fig. 6 is a vertical section of a portion of the rim of a separating wheel taken on the line 6 of Fig. 9, looking in the direction of the arrow, with the separating surface of the wheel in its inner position. Fig. 7 is a vertical section of the separating rim of the wheel, taken in line 7 of Fig. 9, with the separating rim in its outer or normal position. Fig. 8 is a cross section of the rim of the wheel, modified. Fig. 9 is a plan sectional view, taken in line 9 of Fig. 6, with the curbing lever and stop shown in dotted lines. Fig. 10 is a transverse sectional view of a separating wheel, modified, and Fig. 11 is a transverse vertical section of a modified arrangement of separating surface and means for supporting and rotating it.

In making my improved rotatable separating wheel for centrifugal ore separators, to eliminate the lighter and more worthless particles from the heavier and more valuable while in a fine or powdery condition, by the action of centrifugal force, I make a wheel A, preferably of large diameter and supported in a suitable frame-work, and capable of being rotated by any convenient motive power. The portion of the wheel extending out from the center or hub, may, for convenience, be termed the supporting frame-work of the wheel, as it is intended to support the separating rim at or near its circumference. This separating rim, as shown in Fig. 1, is preferably formed of a trough-shaped piece B, with its inner edge turned up into an annular flange $b$. The supporting frame-work of the wheel is also provided with an upturned annular flange $a$, around which the annular flange of the trough is arranged to fit. The two flanges $a$ and $b$ are held together by bolts or rivets. The bottom of the trough, B′, forms what may be termed the separating surface of the rim. Behind or outside of the separating surface of the rim is preferably arranged a supporting back, $B^2$. It will thus be seen that the receiving and separating surfaces are attached to the supporting frame-work of the wheel in a way that will permit the separating rim of the wheel to be forced in, to impart a vibratory motion to it. In order to impart the desired vibratory motion to the separating rim of the wheel, in the construction shown in Fig. 1, I have arranged cam wheels or spider wheels, C, mounted on shafts $c$, rotated by belts driven by the main shaft of the shell, as shown in Fig. 1. As the arms of these cam or spider wheels come around in their rotation, they successively strike against the outer surface of the separating rim, and thus impart a constant vibratory motion to the same. In the construction shown in Figs. 3, 4 and 5, the separating rim is made of an annular plate, preferably rubber, with its lower edge inturned and resting under the receiving plate of the wheel. Around this rubber or flexible separating rim is arranged, the supporting back $B^2$, and between the two are preferably arranged, at suitable intervals, vertical metal strips or plates $b'$, with rods $b^2$ extending out through the supporting back, provided with heads $b^3$. Coiled springs are arranged around the rods to hold these heads out the desired distance from the supporting back. Arranged at suitable distances apart in the curbing are stationary buffers C′, rounded at their corners, as shown in Fig. 5. As the heads $b^3$ are carried around by the revolutions of the wheel, they strike against the buffers C′, and are forced in with a quick sharp blow, thus imparting a tremor or vibration to the flexible separating rim of the wheel.

In the construction shown in Figs 7, 8 and 9, I have shown the separating rim B, made of an inner and outer portion, the inner being trough-shaped, as in Fig. 1. The outer portion of the separating rim, in the construction now under consideration, is made of sections or blocks, and the inner or separating surface of rubber, the blocks being embedded in rubber, as shown in Fig. 9. The separating rim, in this case, is fastened to the supporting back and frame-work of the wheel by eye bolts D and D′. The eye bolt D is provided with a rubber cushion *d*, so that the separating rim will be elastically connected to the supporting back. To impart the desired vibratory motion to the supporting rim, I arrange a wheel E in the curbing, supported on a shaft extending out through the top of the apparatus, and provided with a pulley, *e*, by which the shaft and the wheel may be driven or rotated by a belt connected to any suitable motive power. I arrange a lever, F, fulcrumed at *f*, and embracing the bearing or sleeve in which the shaft of the wheel E is mounted. A stop *f′*, consisting of a set bolt, is arranged in a lug or bracket, as shown at one side of the lever F, so that by turning the bolt in or out, the position of the lever, and consequently, the position of the shaft and wheel E, may be regulated or determined. The stop is arranged at that side toward which the lever would be moved, by the frictional contact of the wheel with the flexible separating rim. The wheel E impinges against the flexible separating rim, as shown in Fig. 9, to the extent that it cuts into the path of the circumference of the rim, which may be regulated as desired by the set screw *f′*, through which the wheel E may be held at a radial position to the separating wheel, or at a greater or less angle to the radius to adjust the degree that its surface will cut into the path of the circumference of the flexible separating rim. This will be readily understood from an inspection of Figs. 6 and 9 of the drawings, and need not be further dwelt upon. It will be understood from this construction that as the flexible rim passes around in its course, it will be deflected or bent in by the wheel E.

In the construction shown in Fig. 10, the shaft of the separating wheel is provided with two pulleys G and G′, connecting it by belts with pulleys on a counter shaft H. The hub of the separating wheel is provided with the rims *g* and *g′*, which are adapted respectively to engage with the lower and upper ends of the pulleys G and G′, as such pulleys are moved respectively toward the hub. To that end, the pulleys are longitudinally movable on the shaft, and are supported by cross arms, *h*, connected to a rod I, and pivotally fulcrumed in brackets *i*. A belt, H′, from a pulley on the shaft H, engages with a pulley J on a stud *j*. A stop or stud *j′* is arranged on the rod I, and a cam segment $j^2$ is arranged on a disk J′, rotated by the pulley J. As the cam segment passes around, it bears against the stop *j′*, and forces it down, and along with it the rod I. A cam K is arranged on the rod I, to bear against a rod *k*, carrying a buffer *k′*, contractible with the flexible separating rim of the wheel. As the rod I is forced down, the cam K forces the buffer rod *k* in, so as to bring the buffer *k′* into contact with the outside of the flexible rim B. As the rod I is forced down, the pulley G′ is forced up into frictional contact with the rim *g′*, and as this pulley is of less diameter than the pulley G, it imparts an accelerated speed of rotation to the separating wheel during the time that the rod I is down and the buffer *k′* is in contact with the flexible separating rim of the wheel. The movement of the rod I, which brings the pulley G′ into frictional contact with its appropriate end of the hub of the separating wheel, moves the pulley G out of contact with its end, so as to permit of this accelerated speed of rotation. The instant that the cam segment $j^2$ passes the stop *j′* on the rod I, such rod is thrown up by means of a spring I′. This upward movement carries the pulley G in turn into frictional contact with its appropriate end of the hub of the separating wheel, and throws the pulley G′ out of contact with its end. At the same time, the buffer *k′* ceases to be pressed in by the cam K, and is moved out by a spring on the rod *k*, from contact with the flexible separating rim. As the pulley G is larger than the pulley G′, as soon as it comes in frictional contact with its end of the hub of the separating wheel, the speed of rotation of the wheel is decreased.

The operation above described takes place every time that the cam segment $J^2$ is carried around in the revolutions of the pulley J, so that the separating wheel is successively driven at alternating speeds of rotation, and the buffers *k′* are alternately forced in against the flexible separating rim, or released from contact with it, so as to impart a tremor or vibratory motion to the separating rim each time the buffers *k′* are brought into contact with it. If desired, the buffers *k′* may remain at all times in contact with the flexible separating rim of the wheel, and be forced farther in, so as to impart increased vibratory motion to the rim at such times, as the speed of the separating wheel is accelerated or increased. By thus alternately driving the separating wheel at a greater or less speed of rotation, the particles accumulating on the separating surface during the retarded speed of rotation, may be thrown off during the accelerated speed. In this arrangement, therefore, both the accelerated speed and the increased vibration of the separating rim co-operate to effect the discharge of the particles which are not thrown off by the normal speed of rotation and vibration of the separating rim.

In Fig. 11 I have shown a modification of my improvements. In this arrangement, I dispense with the main central shaft, and make the supporting frame-work A in the form of a ring resting upon a number of rollers, L, supported in standards or brackets L'. To impart rotation to the separating surface, I provide the outer rim of the frame-work with a series of cogs or teeth *l*, meshing with the gear wheel, *l'*, mounted on the end of a shaft $l^2$, driven by a pulley M, which is connected by a belt to any suitable motive power. In this way sufficient speed of rotation is secured to develop the desired amount of centrifugal force. In order to effect the desired vibration of the separating surface, I arrange the spider or cam wheel C in a standard or bracket at one or more places in the line of its travel, so that its arms or projections will successively contact against the separating surface, and impart to it the vibration desired.

To feed the material to be treated upon the separating surface, a material supply pipe N is led into the proper place to deposit the material where wanted, and to supply the desired quantity of water to the material under treatment, to wash and dilute it, a water supply pipe N' is led in and provided with a number of perforations, through which the water will be sprayed on the separating surface.

It will be apparent from the above description that various modifications in the details of construction by which I carry out or embody my ideas may be employed, and I do not therefore desire to limit myself to details of arrangement or construction, further than as I may specify the same in my claims.

What I regard as new, and desire to secure by Letters Patent, is—

1. In centrifugal ore separators, the combination of a supporting frame-work, an independently vibratable separating surface supported on such frame-work, means for effecting its vibration, and means for rotating such separating surface, at different alternating predetermined speeds, substantially as described.

2. In centrifugal ore separators, the combination of a supporting frame-work, a separating surface mounted on such frame-work and vibratable at desired points in its rotation, means for effecting such vibration at predetermined alternating degrees, and means for rotating the separating surface, substantially as described.

3. In centrifugal ore separators, the combination of a supporting frame-work, a separating surface mounted on the frame-work and vibratable at desired points in its rotation to different and predetermined extents, and adjustable means for effecting such vibrations at predetermined alternating degrees as desired, and means for rotating the separating surface, substantially as described.

4. In centrifugal ore separators, the combination of a supporting frame-work, a vibratable separating surface mounted upon such frame-work, means for effecting its vibration, and means for rotating the separating surface at alternating predetermined differences in speed of rotation, substantially as described.

5. In centrifugal ore separators, the combination of a supporting frame-work, a vibratable separating surface mounted upon such frame-work, means for effecting its vibration at alternating varying degrees, and means for rotating the separating surface at alternating predetermined differences in the speed of rotation, substantially as described.

6. In a centrifugal ore separator, the combination of a rotatable separating surface adapted to be rotated at a desired speed while loading, and means for increasing the speed of rotation for centrifugally discharging the contents, substantially as described.

7. In a centrifugal ore separator, the combination of a rotatable separating surface adapted to be rotated at a desired speed while loading, and means for automatically increasing the speed of rotation for centrifugally discharging the contents, substantially as described.

ORRIN B. PECK.

Witnesses:
THOMAS A. BANNING,
SAMUEL E. HIBBEN.